United States Patent [19]
Packard

[11] 3,906,193
[45] Sept. 16, 1975

[54] MATHEMATICAL CALCULATING

[76] Inventor: Thomas G. Packard, 23910 W. 74th Ave., Edmonds, Wash. 98020

[22] Filed: Feb. 8, 1971

[21] Appl. No.: 113,186

[52] U.S. Cl......... 235/89 R; 235/61 GM; 235/61 B; 235/69
[51] Int. Cl............................................. G06c 3/00
[58] Field of Search ........ 235/89, 83, 61 GM, 61 B; 35/30, 31, 34

[56] References Cited
UNITED STATES PATENTS

| 102,216 | 4/1870 | Brodie | 235/89 R |
| 896,614 | 8/1908 | Benedict | 235/89 R |
| 1,056,206 | 3/1913 | Norman | 235/61 B |
| 1,133,540 | 3/1915 | Dannenberg | 235/61 GM |

Primary Examiner—Stephen J. Tomsky

[57] ABSTRACT

The invention is a numerical calculator with which one can perform the mathematical operations multiplication, division, ratios, etc. The calculator operates by the combined use of an abscissa scale, an ordinate scale, one of which may be offset, and a series of lines that radiate from zero upon one axis to consecutive values upon the other.

3 Claims, 3 Drawing Figures

3,906,193
FIG.1
FIG.2
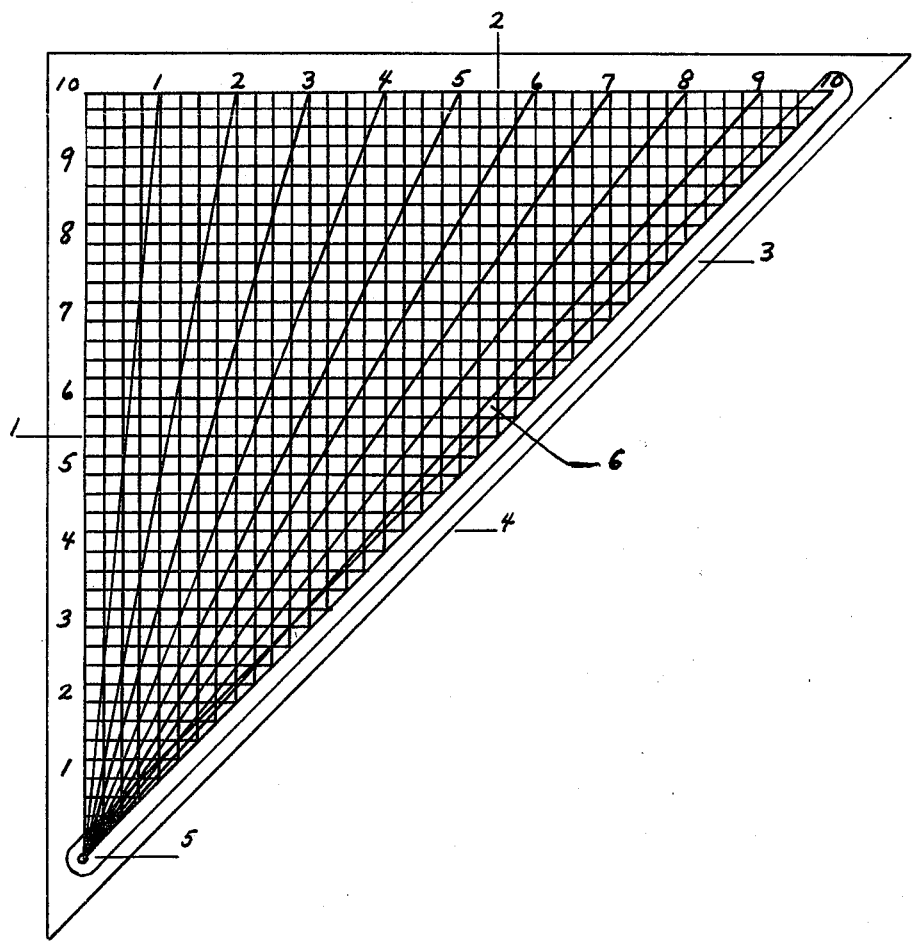
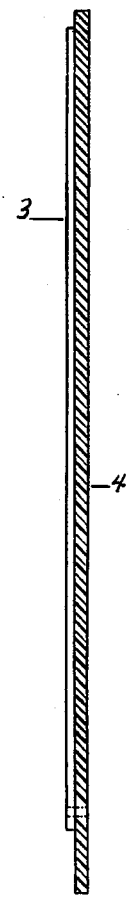
FIG.3
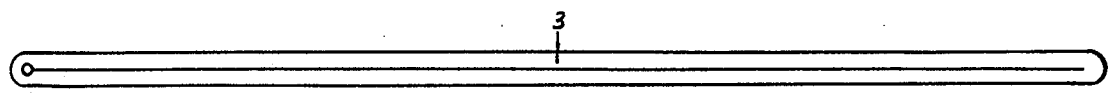

MATHEMATICAL CALCULATING

SUMMARY

The invention is an instrument with which mathematical operations, such as, multiplication, division, ratios etc., can be performed rapidly with only an elementary knowledge of mathematics.

Other merits can be seen in the specification.

DRAWINGS

FIG. 1 is the plan view
1. Indicates ordinate axis
2. Indicates abscissa axis
3. Indicates moveable line
4. Indicates calculator base
5. Indicates zero intersection point and moveable line axis of rotation FIG. 2 is the side view
3. Indicates transparent moveable line
4. Indicates shaded side of calculator base FIG. 3 is a plan view of the moveable line.

The form taken by the invention is not restricted by the above design but is flexible with the scope of the claims.

The invention consists of the combined use of an ordinate scale 1 that is graduated from zero to ten or greater with each unit of scale further subdivided and an abscissa scale 2 that originates from the tenth major division of the ordinate scale that is graduated from zero to ten or greater with each unit of scale further subdivided. There are also ten or more radiating lines 6 that intersect and terminate upon the zero point on the ordinate scale and radiate to consecutive graduated values upon the abscissa scale. There is also a moveable line 3 with a terminal similarly at zero and free to rotate to any value upon the abscissa scale.

The process of using is as follows, for multiplication take any value upon the ordinate scale and move parallel to the abscissa scale until the desired value is found among the radiating lines by inspection or by placing the moveable line on the desired value upon the abscissa scale and determining the intersection point with the parallel from the ordinate scale, when the intersection is found move parallel to the ordinate scale until intersection with the abscissa scale and read the value of the intersection point, which is the product.

For division locate the value to be divided upon the abscissa scale, similarly locate the divisor on the ordinate scale, now determine the intersection point common to both values on the grid system and find the quotient by proceeding to the abscissa scale in such a way as to maintain the same spacing relative to adjacent radiating lines or alternatively the moveable line may be used by placing it over the common point and reading the value under the line on the abscissa scale.

EXAMPLE

8×5=40

Locate 8 on the ordinate scale then move parallel to the abscissa scale until the fifth radiating line is contacted, now move parallel to the ordinate axis and read 40 on the abscissa axis.

30 Divided by 6=5

Locate thrity on the abscissa axis and move parallel to the ordinate axis until intersecting the parallel that issues from six on the ordinate axis. Now follow the sloping line until intersection with the abscissa axis.

I claim:

1. I claim an instrument of the character discribed comprising a member that has the shape of a triangle and the side of the triangle has a scale that is graduated from zero to ten or more by units with each unit of scale subdivided further and the upper portion of the triangle has a scale that is graduated from one to ten or more by units with each unit of the scale subdivided further and this scale is precisely fixed at the tenth major unit of the side scale at a ninety degree angle and the area of the triangle is a field of lines that are common with the graduations on each scale at a ninety degree angle and there are also a series of lines the number of which are equal to the number of unit graduations on the upper scale and these lines issue from the zero point on the side scale and consecutively intersect the unit graduations on the upper scale.

2. I claim an instrument of the character discribed comprising a member that has the shape of a triangle and the side of the triangle has a scale that is graduated from zero to ten or more by units and the upper portion of the triangle has a scale that is graduated from one to ten or more by units and this scale is precisely fixed at the tenth major graduation of the side scale at a ninety degree angle and the area of the triangle is a field of lines that are common with the graduations on each scale at a ninety degree angle and there are also a series of lines the number of which are equal to the number of unit graduations on the upper scale and these lines issue from the zero point on the side scale and consecutively intersect the unit graduations on the upper scale and a variable line is also fixed to the zero point of the triangles side scale and is free to rotate to any position on the upper scale.

3. I claim an instrument of the character discribed comprising a member that has the shape of a triangle and the side of the triangle has a scale that is graduated from zero to ten or more by units and the upper portion of the triangle has a scale that is graduated from one to ten or more by units and this scale is precisely fixed at the tenth major graduation of the side scale at a 90° angle and the area of the triangle is a field of lines that are common with the graduations on each scale at a ninety degree angle and there are also at least eleven lines that issue from the zero point at the triangle vertex and all of these lines except one intersect with each unit graduation on the upper scale and this one line is a variable line and is free to move to any position on the scale.

* * * * *